United States Patent
Dittfurth et al.

(10) Patent No.: US 6,537,672 B1
(45) Date of Patent: Mar. 25, 2003

(54) POWDER-COATED DOMESTIC APPLIANCES WITH A TOP COAT BASED ON EPOXY SILANE

(75) Inventors: Carola Dittfurth, Saarbruecken (DE); Stefan Sepeur, Wadgassen-Schaffhausen (DE); Ralf-Peter Winkler, Saarbruecken (DE); Helmut Schmidt, Saarbruecken-Guedingen (DE); Frank Joerdens, Traunreut (DE); Gerhard Schmidmayer, Bad Endorf (DE)

(73) Assignees: Institut für Neue Materialien gem. GmbH, Saarbrücken (DE); BSH Bosch und Siemens Hausgeräte GmbH, München (DE)

( * ) Notice: Subject to any disclaimer, the term of this patent is extended or adjusted under 35 U.S.C. 154(b) by 0 days.

(21) Appl. No.: 09/856,587

(22) PCT Filed: Dec. 10, 1999

(86) PCT No.: PCT/EP99/09790

§ 371 (c)(1), (2), (4) Date: May 22, 2001

(87) PCT Pub. No.: WO00/36034

PCT Pub. Date: Jun. 22, 2000

(30) Foreign Application Priority Data

Dec. 11, 1998 (DE) .......................................... 198 57 317

(51) Int. Cl.$^7$ ................................................. B32B 9/04
(52) U.S. Cl. ................... 428/413; 428/447; 106/287.13
(58) Field of Search .................................. 428/447, 413; 106/287.13

(56) References Cited

U.S. PATENT DOCUMENTS

| | | | | |
|---|---|---|---|---|
| 5,049,596 A | * | 9/1991 | Fujimoto et al. | 523/427 |
| 5,212,243 A | * | 5/1993 | Toyoda et al. | 525/187 |
| 5,280,098 A | * | 1/1994 | Witucki et al. | 528/17 |
| 5,635,548 A | * | 6/1997 | Kittle et al. | 523/220 |
| 5,952,439 A | * | 9/1999 | Morita et al. | 525/476 |
| 5,981,659 A | * | 11/1999 | Geck et al. | 525/100 |
| 6,090,890 A | * | 7/2000 | Murakami et al. | 525/104 |
| 6,140,419 A | * | 10/2000 | Barglik-Chory et al. | 525/100 |
| 6,228,921 B1 | * | 5/2001 | Kasemann et al. | 524/381 |

* cited by examiner

Primary Examiner—Margaret G. Moore
(74) Attorney, Agent, or Firm—Heller Ehrman White & McAuliffe LLP

(57) ABSTRACT

The invention relates to domestic appliances bearing on a powder-coated surface a scratch-resistant and abrasion-resistant topcoat of a coating material which comprises:

a) condensates based on hydrolysable silanes containing at least one non-hydrolysable substituent, the hydrolysable silanes having an epoxide group on at least one non-hydrolysable substituent;

b) a curing catalyst selected from Lewis bases and alkoxides of titanium, zirconium or aluminium;

c) nanoscale particulate inorganic solids having a particle size in the range from 1 to 100 nm; and d) at least one organic monomer, oligomer or polymer containing at least one epoxide group.

17 Claims, No Drawings

POWDER-COATED DOMESTIC APPLIANCES WITH A TOP COAT BASED ON EPOXY SILANE

The present invention relates to domestic appliances with a scratch-resistant and abrasion-resistant topcoat of a coating material comprising condensates based on hydrolysable silanes containing at least one epoxide group, on a powder-coated substrate.

The advantages of powder coating materials for the coating of surfaces, such as very good adhesion to metal surfaces, corrosion protection for metal surfaces, and ease of processability, for example, are known from the prior art. However, there is great interest in improvements to the coat morphology (increase in smoothness and uniformity, reduction in coat thickness) and in increasing the surface hardness and abrasion resistance. In the field of acrylate powder coating materials, a number of processes are known for providing the powder-coated surface with a coating based on organic-inorganic copolymers which is applied by wet chemical means.

JP-A-04318088 describes a methacryloyloxy-propyltrimethoxysilane-styrene copolymer for coating surfaces coated with an acrylate powder coating material. The transparent coatings, 20–30 μm in thickness, are said to possess good acid-resistance and scratch-resistance.

JP-A-06039349 describes a coating material based on polymerization products of hydrolysable silanes with a methacryloyloxypropyl substituent, further hydrolysable silanes, acrylate, methacrylate and epoxy methacrylate, and also the curing catalyst aluminium tris(acetylacetonate).

It is known that essentially inorganic coatings, i.e. coatings based on inorganic components, frequently have good surface hardness and abrasion resistance. Because of their high hardness, however, inorganic coatings are more brittle than essentially organic coatings, i.e. coatings based on organic components, with the result that cracking may occur. In particular, inorganic coatings are more brittle than organic powder coatings, with the result that cracking may occur on thermal curing at temperatures near the crosslinking temperature of the powder coating material and on cyclic temperature loading of the composite coating system.

The present invention is therefore based on the object of applying a thin, abrasion-resistant coat to powder-coated surfaces of domestic appliances without the occurrence of cracking or brittleness under temperature load.

This object is achieved by means of the domestic appliances of the invention, bearing on a powder-coated surface a scratch-resistant and abrasion-resistant topcoat of a coating material which comprises:

a) condensates based on hydrolysable silanes containing at least one non-hydrolysable substituent, the hydrolysable silanes having an epoxide group on at least one non-hydrolysable substituent;

b) a curing catalyst selected from Lewis bases and alkoxides of titanium, zirconium or aluminium;

c) nanoscale particulate inorganic solids having a particle size in the range from 1 to 100 nm; and d) at least one organic monomer, oligomer or polymer containing at least one epoxide group.

In accordance with the invention, surprisingly thin, highly abrasion-resistant coatings are obtained which adhere particularly well to powder-coated surfaces, are very well adapted to the powder coating in their flexibility, and consequently possess a markedly improved cyclic temperature resistance (no cracking during preparation and application) and, moreover, exhibit very good scratch resistance or surface hardness and abrasion resistance.

In relation to the prior art, the process of the invention is easier to carry out, since it does not require complex preparation of copolymers or polymerization products of hydrolysed silanes with organic monomers or oligomers prior to the application of the coating material, so that it is possible to form substantially thinner coats having the aforementioned advantages.

The hydrolysable silanes containing at least one non-hydrolysable substituent, the hydrolysable silanes having an epoxide group on at least one non-hydrolysable substituent, comprise one or more silicon compounds possessing from 1 to 3, preferably 2 or 3, with particular preference 3, hydrolysable radicals and 1, 2 or 3, preferably one, non-hydrolysable radical. At least one of the non-hydrolysable radicals possesses at least one epoxide ring.

The silanes of component a) comprise, for example, compounds of the general formula (I):

$$R_n SiX_{4-n} \quad (I)$$

in which n is 1, 2 or 3, preferably 1 or 2, with particular preference 1, X may be identical or different and is a halogen (F, Cl, Br and I, especially Cl and Br), alkoxy (especially $C_{1-4}$ alkoxy, such as methoxy, ethoxy, n-propoxy, isopropoxy and butoxy, for example), aryloxy (especially $C_{6-10}$ aryloxy, e.g. phenoxy), acyloxy (especially $C_{1-4}$ acyloxy, such as acetoxy and propionyloxy, for example) and alkylcarbonyl (e.g. acetyl), and R may be identical or different and is a non-hydrolysable radical, at least one radical R having an epoxide group.

Particularly preferred hydrolyzable radicals X are alkoxy groups, especially methoxy and ethoxy. Examples of non-hydrolysable radicals R without an epoxide ring are alkyl, especially $C_{1-4}$ alkyl (such as methyl, ethyl, propyl and butyl, for example), alkenyl (especially $C_{2-4}$ alkenyl, such as vinyl, 1-propenyl, 2-propenyl and butenyl, for example), alkynyl (especially $C_{2-4}$ alkynyl, such as acetylenyl and propargyl, for example) and aryl (especially $C_{6-10}$ aryl, such as phenyl and naphthyl, for example), it being possible for the groups just mentioned to carry, if desired, one or more substituents, such as halogen and alkoxy, for example. Also deserving of mention in this context of radicals R are methacrylic and methacryloxypropyl radicals.

Examples of non-hydrolysable radicals R with an epoxide ring are in particular those possessing a glycidyl or glycidyloxy group. They may be linked to the silicon atom via an alkylene group, e.g. a $C_{1-6}$ alkylene, such as methylene, ethylene, propylene, butylene. Specific examples of hydrolysable silanes which may be used in accordance with the invention may be found, for example, in EP-A-195493.

Hydrolysable silanes which are particularly preferred in accordance with the invention are those of the general formula (II):

$$X_3 SiR \quad (II)$$

in which the radicals X, identical to or different from one another (preferably identical), are a hydrolysable group, for example one of the radicals X described above for the formula (I), preferably $C_{1-4}$ alkoxy and with particular preference methoxy and ethoxy, and R is a glycidyloxy-$C_{1-6}$ alkylene radical. Owing to its ready availability, γ-glycidyloxypropyltrimethoxysilane (referred to below as GPTS for short) is used with particular preference in accordance with the invention.

In addition to the hydrolysable silanes containing at least one epoxide group, other hydrolysable compounds may also be used to construct the inorganic matrix. By other hydrolysable compounds are meant hereinbelow those not comprising hydrolysable silane containing at least one epoxide group. These other compounds likewise include an inorganic element with hydrolysable substituents attached to it.

It is possible to use one or more other hydrolysable compounds together with the hydrolysable silane or silanes containing at least one epoxide group in component a), the amount of the other hydrolysable compounds preferably not exceeding 80 mol %, and especially 60 mol %, based on the total hydrolysable compounds employed. Preferably at least 10, and with particular preference at least 20, mol % of all hydrolysable compounds employed are the other hydrolysable compounds which are different from the hydrolysable silane or silanes containing at least one epoxide group on a non-hydrolysable substituent.

Examples of suitable other hydrolysable compounds are hydrolysable compounds of elements selected from the third and fourth main groups (especially B, Al, Ga, Si, Ge and Sn) and from the third to fifth transition groups of the Periodic Table (especially Ti, Zr, Hf, V, Nb and Ta). However, other metal compounds may also lead to advantageous results, such as those of Zn, Mo and W, for example. With particular preference, the compounds in question comprise hydrolysable compounds of elements from the group consisting of Si, Ti, Zr, Al, B, Sn and V which are hydrolysed with the hydrolysable silane or silanes of component a).

All of these compounds contain hydrolysable groups. As examples, reference may be made to the examples of X listed for formula (I). In addition to the hydrolysable groups, the compounds may also contain non-hydrolysable groups. Except for Si, however, this is not preferred. As examples, reference may be made to the examples of R listed for formula (I), with the proviso that R is not an epoxy-containing group. For the silanes which may be used, reference may be made—with the aforementioned proviso—for example to the general formula (I), in which n may also be 0. Specific examples of these other hydrolysable compounds are: $Si(OCH_3)_4$, $Si(OC_2H_5)_4$, $Si(O\text{-}n\text{-}$ or $i\text{-}C_3H_7)_4$, $Si(OC_4H_9)_4$, $SiCl_4$, $HSiCl_3$, $Si(OOCCH_3)_4$, $CH_3\text{—}SiCl_3$, $CH_3\text{—}Si(OC_2H_5)_3$, $C_2H_5\text{—}SiCl_3$, $C_2H_5\text{—}Si(OC_2H_5)_3$, $C_3H_7\text{—}Si(OCH_3)_3$, $C_6H_5\text{—}Si(OCH_3)_3$, $C_6H_5\text{—}Si(OC_2H_5)_3$, $(CH_3O)_3\text{—}Si\text{—}C_3H_6\text{—}Cl$, $(CH_3)_2SiCl_2$, $(CH_3)_2Si(OCH_3)_2$, $(CH_3)_2Si(OC_2H_5)_2$, $(CH_3)_2Si(OH)_2$, $(C_6H_5)_2SiCl_2$, $(C_6H_5)_2Si(OCH_3)_2$, $(C_6H_5)_2Si(OC_2H_5)_2$, $(i\text{-}C_3H_7)_3SiOH$, $CH_2\text{=}CH\text{—}Si(OOCCH_3)_3$, $CH_2\text{=}CH\text{—}SiCl_3$, $CH_2\text{=}CH\text{—}Si(OCH_3)_3$, $CH_2\text{=}CH\text{—}Si(OC_2H_5)_3$, $CH_2\text{=}CH\text{—}Si(OC_2H_4OCH_3)_3$, $CH_2\text{=}CH\text{—}CH_2\text{—}Si(OCH_3)_3$, $CH_2\text{=}CH\text{—}CH_2\text{—}Si(OC_2H_5)_3$, $CH_2\text{=}CH\text{—}CH_2\text{—}Si(OOCCH_3)_3$, $CH_2\text{=}C(CH_3)\text{—}COO\text{—}C_3H_7\text{—}Si(OCH_3)_3$, $CH_2\text{=}C(CH_3)\text{—}COO\text{—}C_3H_7\text{—}Si(OC_2H_5)_3$, $Al(OCH_3)_3$, $Al(OC_2H_5)_3$, $Al(O\text{-}n\text{-}C_3H_7)_3$, $Al(O\text{-}i\text{-}C_3H_7)_3$, $Al(OC_4H_9)_3$, $Al(O\text{-}i\text{-}C_4H_9)_3$, $Al(O\text{-}sec\text{-}C_4H_9)_3$, $AlCl_3$, $AlCl(OH)_2$, $Al(OC_2H_4OC_4H_9)_3$, $TiCl_4$, $Ti(OC_2H_5)_4$, $Ti(OC_3H_7)_4$, $Ti(O\text{-}i\text{-}C_3H_7)_4$, $Ti(OC_4H_9)_4$, $Ti(2\text{-ethylhexoxy})_4$; $ZrCl_4$, $Zr(OC_2H_5)_4$, $Zr(OC_3H_7)_4$, $Zr(O\text{-}i\text{-}C_3H_7)_4$, $Zr(OC_4H_9)_4$, $ZrOCl_2$, $Zr(2\text{-ethylhexoxy})_4$, and also Zr compounds containing complexing radicals, such as β-diketone and methacrylic radicals, for example, $BCl_3$, $B(OCH_3)_3$, $B(OC_2H_5)_3$, $SnCl_4$, $Sn(OCH_3)_4$, $Sn(OC_2H_5)_4$, $VOCl_3$ and $VO(OCH_3)_3$.

The hydrolysable silanes of component a) and, if appropriate, the other hydrolysable compounds are used together, for example, in an amount of from 40 to 90% by weight, based on the mass of all hydrolysable compounds (component a) and the other hydrolysable compounds) and of components b) to d).

The coating material for the topcoat further comprises a curing catalyst selected from Lewis bases and alkoxides of titanium, zirconium or aluminium. This curing catalyst acts in particular as a catalyst for epoxide-epoxide and/or polyol-epoxide crosslinking. In the corresponding compositions, the curing catalyst is used in general in an amount of from 0.01 to 0.6 mol per mole of epoxide group of the hydrolysable silanes of component a). Preference is given to amounts in the range from 0.02 to 0.4, and in particular from 0.05 to 0.3, mol of curing catalyst per mole of epoxide group.

As the curing catalyst it is possible, for example, to use a Lewis base. The Lewis base preferably comprises a nitrogen compound. Nitrogen compounds of this kind may be selected, for example, from N-heterocycles, amino-containing phenols, polycyclic amines and ammonia (preferably in the form of an aqueous solution). Specific examples are 1-methylimidazole, 2-(N,N-dimethylaminomethyl)phenol, 2,4,6-tris(N,N-dimethylaminomethyl)phenol and 1,8-diazabicyclo[5.4.0]-7-undecene. Among these compounds, particular preference is given to 1-methylimidazole.

A further class of nitrogen-containing Lewis bases which may be used in accordance with the invention are hydrolysable silanes possessing at least one non-hydrolysable radical comprising at least one primary, secondary or tertiary amino group. Such silanes may be hydrolysed together with the hydrolysable silane or silanes of component a) and in that case constitute a Lewis base built into the organically modified inorganic network. Preferred nitrogen-containing silicon compounds are those of the general formula (III):

$$X_3SiR''  \hspace{2cm} (III)$$

in which the radicals X are defined as above in the case of the general formula (I) and R" is a non-hydrolysable radical attached to Si and comprising at least one primary, secondary or tertiary amino group. Specific examples of silanes of this kind are 3-aminopropyltrimethoxysilane, 3-aminopropyltriethoxysilane, N-(2-aminoethyl)-3-aminopropyltrimethoxysilane, N-[N'-(2'-aminoethyl)-2-aminoethyl]-3-aminopropyltrimethoxysilane and N-[3-(triethoxysilyl)propyl]-4,5-dihydroimidazole.

Instead of or in addition to the Lewis base it is possible as curing catalyst to use an alkoxide of Ti, Zr or Al. The alkoxide in question is preferably of the general formula (IV):

$$M(OR''')_m \hspace{2cm} (IV)$$

in which M is Ti, Zr or Al, R''' is an alkyl group having preferably 1 to 4 carbon atoms (methyl, ethyl, n-propyl, isopropyl, n-butyl, sec-butyl or tert-butyl) or an alkyleneoxyalkyl group having preferably 1 to 4 carbon atoms both for the alkylene unit and for the alkyl unit (e.g. methylene, ethylene, 1,2-propylene, 1,3-propylene and 1,4-butylene for the alkylene unit and the examples given above for the alkyl group for the alkyl unit) and n is 4 (M=Ti, Zr) or 3 (M=Al) Preferred curing catalysts are $Al(OCH_2CH_2OC_4H_9)_3$ (aluminium tributoxyethoxide), where the butyl group is preferably an n-butyl group, aluminium sec-butoxide, and mixtures of aluminium tributoxy ethoxide and aluminium sec-butoxide.

The curing catalyst is used, for example, in an amount of from 2 to 15% by weight, based on the mass of all hydrolysable compounds and of components b) to d).

The nanoscale particulate inorganic solids may comprise any desired inorganic materials, but in particular comprise metal or metal compounds such as, for examples (optionally hydrated) oxides such as ZnO, CdO, $SiO_2$, $TiO_2$, $ZrO_2$, $CeO_2$, $SnO_2$, $Al_2O_3$, $In_2O_3$, $La_2O_3$, $Fe_2O_3$, $Cu_2O$, $Ta_2O_5$, $Nb_2O_5$, $V_2O_5$, $MoO_3$ or $WO_3$; chalcogenides such as, for example, sulphides (e.g. CdS, ZnS, PbS and $Ag_2S$), selenides (e.g. GaSe, CdSe and ZnSe) and tellurides (e.g. ZnTe or CdTe), halides such as AgCl, AgBr, AgI, CuCl, CuBr, $CdI_2$ and $PbI_2$; carbides such as $CdC_2$ or SiC: arsenides such as AlAs, GaAs and GeAs; antimonides such as InSb; nitrides such as BN, AlN, $Si_3N_4$ and $Ti_3N_4$; phosphides such as GaP, InP, $Zn_3P_2$ and $Cd_3P_2$; phosphates, silicates, zirconates, aluminates, stannates and the corresponding mixed oxides (e.g. those with perovskite structure such as $BaTiO_3$ and $PbTiO_3$). It is possible to use one kind of nanoscale particulate inorganic solids or a mixture of different nanoscale particulate inorganic solids.

The nanoscale particulate inorganic solids preferably comprise an oxide, oxide hydrate, nitride or carbide of Si, Al, B, Zn, Cd, Ti, Zr, Ce, Sn, In, La, Fe, Cu, Ta, Nb, V, Mo or W, with particular preference of Si, Al, B, Ti and Zr. Preferred particulate materials are boehmite, $ZrO_2$ and $TiO_2$ and also titanium nitride. Particular preference is given to nanoscale boehmite particles.

The nanoscale particulate inorganic solids are obtainable commercially in the form of powders and the preparation of (acidically stabilized) sols thereof is likewise known in the prior art. Furthermore, reference may also be made for this purpose to the preparation examples given below. The principle of the stabilization of nanoscale titanium nitride by means of guanidine propionic acid is described, for example, in DE 43 34 639.

The variation of the nanoscale particles generally goes hand in hand with a variation of the refractive index of the corresponding materials. Thus, for example, replacing boehmite particles by $ZrO_2$ or $TiO_2$ particles leads to materials having higher refractive indices, the refractive index resulting additively, in accordance with the Lorentz-Lorenz equation, from the volume of the component of high refractive index and the volume of the matrix.

The nanoscale particulate inorganic solids generally possess a particle size in the range from 1 to 100 nm, preferably from 2 to 50 nm, and with particular preference from 5 to 20 nm. This material may be used in the form of a powder but is preferably used in the form of a sol (especially an acidically stabilized sol).

The nanoscale particulate inorganic solids may be used, especially when value is placed on very good properties of high scratch resistance, in an amount of up to 50% by weight, based on the mass of all hydrolysable compounds and of components b) to d). In general, the amount of nanoscale particulate inorganic solids is in the range from 1 to 40, preferably from 1 to 30, with particular preference from 1 to 15% by weight, based on the mass of all hydrolysable compounds and of components b) to d).

It is also possible to use nanoscale particulate inorganic solids which have been provided with addition-polymerizable and/or polycondensable organic surface groups. Such addition-polymerizable and/or polycondensable nanoparticles and their preparation are described, for example, in DE 19746885.

As a further component, the topcoat material used in accordance with the invention comprises at least one organic monomer, oligomer or polymer containing at least one epoxide group, or mixtures thereof. These organic monomers, oligomers or polymers containing epoxide groups are, for example, compounds which are known per se and which are used in accordance with the prior art as epoxy resins, casting resins and epoxy reactive diluents. They may comprise, for example, aliphatic, cycloaliphatic or aromatic compounds, aliphatic, cycloaliphatic or aromatic esters or ethers, or mixtures thereof, based for example on ethylene glycol, 1,4-butanediol, propylene glycol, 1,6-hexanediol, cyclohexanedimethanol, pentaerythritol, bisphenol A, bisphenol F or glycerol, in each case as monomers, oligomers or polymers, which contain at least one epoxide group. They may also contain a plurality of epoxide groups; in the case of monomers or oligomers, for example, 2 or 3.

Specific examples are 3,4-epoxycyclohexylmethyl 3,4-epoxycyclohexanecarboxylate, bis(3,4-epoxycyclohexyl) adipate, 1,4-butanediol glycidyl ether, phenyl glycidyl ether, o-cresyl glycidyl ether, p-tert-butylphenyl glycidyl ether, cyclohexanedimethanol diglycidyl ether, glycerol triglycidyl ether, neopentyl glycol diglycidyl ether, pentaerythritol polyglycidyl ether, 2-ethylhexyl glycidyl ether, 1,6-hexanediol diglycidyl ether, polypropylene glycol diglycidyl ether, epoxy resins based on bisphenol A, epoxy resins based on bisphenol F, and epoxy resins based on bisphenol A/F.

The epoxy resins which may be used preferably have an epoxide equivalent weight of from 130 to 455 g/equivalent and are preferably liquid with a viscosity of from 1.2 to 12,000 mPas at 25° C.

As organic monomer, oligomer or polymer containing at least one epoxide group it is possible, for example, to use readily available commercial products, such as the products Ruetapox® (from Bakelite AG), the products Polypox R® (from U. Prümmer Polymer-Chemie GmbH), the products Araldit® GY 257, Araldit® GY 266, Araldit GY 179, Araldit® PY 309, Araldit® DY 3601, Araldit® CIBA, Araldit® GY 285 (from Carl Roth and from Ciba-Geigy) and the products Cyracure® Resin UVR 6128, Cyracure® Resin UVR 6110 (from Union Carbide).

The organic monomer, oligomer or polymer containing at least one epoxide group is used, for example, in an amount of from 6 to 30% by weight, based on the mass of all hydrolysable compounds and of components b) to d).

To form the condensates a), the hydrolysable silanes having at least one non-hydrolysable substituent containing at least one epoxide group, together if used with the above-described other hydrolysable compounds, are subjected to hydrolysis. Hydrolysis is preferably carried out using a catalyst. Preferred catalysts are those which are not at the same time condensation catalysts for the epoxide-epoxide crosslinking. A preferred acidic catalyst is aqueous HCl. The hydrolysis is preferably conducted using from 0.5 to 4.0 mol of $H_2O$ per mole of hydrolysable radical. The hydrolysis is conducted, for example, at room temperature.

The hydrolysis is also accompanied by condensation reactions between the hydrolysable compounds, producing condensates. The degree of condensation depends on the reaction parameters, so that the person skilled in the art can adjust the degree of condensation, as and when required, by adjusting these parameters. In general, the procedure is such that, although some condensation has taken place prior to the addition of the remaining components b) to c), condensation is not yet complete, so that it is also possible to talk of precondensates. However, the nanoscale particulate inorganic solids (component c)) may also be added to the hydrolysable silanes and, if appropriate, the other hydrolysable compounds prior to the hydrolysis. Preferably, the nanoscale particulate inorganic solids are added in the form of a suspension in the preferred catalyst, aqueous HCl.

Hydrolysis and partial condensation are followed by the addition of the other components in any desired sequence. As mentioned, however, the hydrolysis may also take place, for example, in the presence of the nanoscale particulate inorganic solids.

Where in addition to the relatively slow-to-react silicon compounds use is also made of other hydrolysable compounds which are more reactive, such as compounds of Ti, Zr and Al, for example, it is advisable to add the water in steps and/or with ice cooling and/or to use compounds which have been made slower to react by complexation (as in the case of $Al(OC_2H_4OC_4H_9)_3$, for example).

If desired, inert solvents may be added to the compositions at any stage of the preparation for the purpose of adjusting the Theological properties of the compositions. These solvents preferably comprise alcohols and/or alcohol ethers which are liquid at room temperature, for example $C_{1-8}$ alcohols, which in addition are also formed during the hydrolysis of the preferably employed alkoxides of the corresponding elements, or monoethers of diols such as ethylene glycol or propylene glycol with $C_{1-8}$ alcohols.

Furthermore, the coating material for the topcoat may comprise further additives. These comprise the customary additives, such as colorants, levelling agents, UV stabilizers, antioxidants, such as sterically hindered amines (HALS), photoinitiators, photosensitizers (if photochemical curing of the composition is intended), and thermal polymerization catalysts, for example.

The substrate to be coated may comprise, for example, a substrate made of metal, glass, plastic, wood, or ceramic. The substrate is preferably of metal. The substrate may have been pretreated, by phosphating, for example. If appropriate, the substrate has already been provided with customary primers or coatings.

A powder coating material is applied to the substrate. A powder coating material comprises a coating material which is applied in powder form and whose film-forming phase comprises binder, possibly pigments, possibly fillers and possibly additives, and which after baking forms a coating film. The powder coating material employed may comprise any of the powder coating materials known from the prior art. For thermoset coating films (thermosetting powder coatings), curing agents and binders such as epoxides, polyesters, epoxy-polyester mixtures, polyurethanes or acrylates, for example, are used. In the case of thermoplastic powder coating materials, polyolefins or PVC, for example, are used as binders.

The powder coating material is applied by the customary techniques. Subsequently, a film on the substrate is formed from the powder, and is cured. The coating material for the topcoat is then applied to the cured coating film formed from the powder coating material.

The application of the above-described topcoat material to the powder-coated substrate may take place by standard coating techniques, such as dipping, spreading, brushing, knife coating, rolling, spraying and spin coating, for example.

Subsequently, directly or after initial drying at room temperature beforehand (for partial removal of the solvents), a curing (condensation) is carried out. Curing preferably takes place thermally at temperatures in the range from 50 to 300° C., preferably from 70 to 200° C., with very particular preference from 90 to 180° C., under reduced pressure if desired.

By means of the topcoat materials used in accordance with the invention, topcoat thicknesses of, for example, from 1 to 30 μm, preferably from 1 to 20 μm and in particular from 3 to 10 μm may be obtained.

The coatings may if desired possess high transparency and are also notable for high scratch resistance.

Furthermore, it has surprisingly been found that by using the organic monomers, oligomers and/or polymers containing at least one epoxide group it is possible to obtain no disadvantageous embrittlement but rather, in contrast, an advantageous flexibilization without, adversely affecting the scratch-, abrasion- or acid-resistance. Very well-adhering topcoat films are formed whose flexibility is very well adapted to the powder coating and which therefore possess a markedly improved cyclic temperature stability (no cracking during preparation and application). The topcoat compensates for unevennesses in the powder coating surface, and the coated particles acquire a more appealing appearance.

The topcoat materials used in accordance with the invention are therefore outstandingly suitable for coating powder-coated substrates of domestic appliances. They are particularly suitable for coating powder-coated surfaces or casings, especially metal casings, of domestic appliances.

Examples of powder-coated surfaces or casings, especially metal casings, for domestic appliances are stoves, stove-tops, refrigerator/freezers, washers, clothes dryers, dishwashers, kitchen vents, coffee/tea makers, irons, toasters, flow heaters, hot water tanks, water cookers, egg cookers, food processors, hair dryers, dryers, deep fat fryers, bread-cutters, blenders, vacuum cleaners and hand dryers.

The examples which follow are intended to illustrate the present invention without, however, restricting its scope.

EXAMPLE 1 a) Preparation of a Boehmite Sol 104.62 g of 0.1 N HCl were added to 12.82 g of acetic acid-stabilized (6.4% by weight acetic acid) boehmite powder. Subsequent ultrasound treatment (20 minutes) produced a transparent, colourless solution which was used further directly to prepare the coating sol.

b) Preparation of the Coating Sol 24.3 g of the above boehmite sol were added to a mixture of 118.17 g of GPTS and 62.50 g of tetraethoxysilane (TEOS). The reaction mixture was stirred at room temperature for 2 h and then 18.93 g of aluminium tributoxyethoxide were added with ice cooling. The resulting sol was stirred at room temperature for 2 h and then 93.14 g of the above boehmite sol and 79.30 g of butoxyethanol were added with ice cooling. The pot life was several months on storage at 4° C.

c) Production of the Coating

The coating sol was applied by spin coating to powder-coated metal panels. The viscosity of the material was adapted to the process by adding 1-butanol. The panels were flashed off at 25° C. for 5 minutes and cured at 160° C. for 30 minutes.

d) Characterization

A transparent coating of 6 μm in thickness, containing cracks, was obtained on the powder-coated surface. The other properties are summarized in Table 1 column 3.

EXAMPLE 2 a) Preparation of a Boehmite Sol 104.62 g of 0.1 N HCl were added to 12.82 g of acetic acid-stabilized (6.4% by weight acetic acid) boehmite powder. Subsequent ultrasound treatment (20 minutes) produced a transparent, colourless solution which was used further directly to prepare the coating sol.

b) Preparation of the Coating Sol 24.3 g of the above boehmite sol were added to a mixture of 118.17 g of GPTS and 62.50 g of TEOS. The reaction mixture was stirred at room temperature for 2 h and then 18.93 g of aluminium tributoxyethoxide were added with ice cooling. The resulting sol was stirred at room temperature for 2 h and then 93.14 g of the above boehmite sol and 79.30 g of butoxyethanol were added with ice cooling. The pot life was several months on storage at 4° C.

c) Production of the Coating 80.0 g of 3,4-epoxycyclohexylmethyl 3,4-epoxycyclohexanecarboxylate were dissolved with stirring in 396.34 g of the coating sol. The coating sol was applied by spin coating to powder-coated metal panels. The viscosity of the material was adapted to the process by adding 1-butanol. The panels were flashed off at 25° C. for 5 minutes and cured at 160° C. for 30 minutes.

d) Characterization

A crack-free transparent coating of 6 μm in thickness, was obtained on the powder-coated surface. The other properties are summarized in Table 1 column 4.

TABLE 1

Properties of uncoated and coated substrates

| Test | Uncoated substrate (powder coating surface) | Substrate coated in accordance with Example 1 | Substrate coated in accordance with Example 2 |
|---|---|---|---|
| Appearance[1] after curing | no cracks | cracks | no cracks |
| Adhesion[2] | 0/0 | not applicable owing to cracks | 0/0 |
| Cyclic temperature stability[3] | >12 | not applicable owing to cracks | 5 |
| Abrasion[4] | 18 | not applicable owing to cracks | 4 |
| Acid stability[5] | no damage | not applicable owing to cracks | no damage |
| Baking oven spray[6] | no damage | not applicable owing to cracks | no damage |

[1]Appearance: Visibility of cracks at magnifications 1x to 40x
[2]Adhesion: Cross-cut, tape test (0 = best score)
[3]Temperature cycling: 1 cycle = 10 min at 200° C. then 10 min of cooling to RT; number of cycles until cracks become visible at magnifications 1x to 40x
[3]Abrasion: Taber Abraser, 1000 cycles, 500 g load, cS 10F wheels, loss of mass in mg/1000 cycles
[5]Acid stability: 30 min exposure to vinegar essence; (brown) at RT and 50° C., visual evaluation for damage to the coating
[6]Baking oven spray: 30 min exposure to baking oven spray at RT and 50° C., visual evaluation for damage to the coating

We claim:

1. A domestic appliance having a powder-coated surface, the powder-coated surface having thereon a scratch-resistant and abrasion-resistant topcoat of a coating material prepared from the following components:
   (a) a condensate based on a hydrolyzable silane containing at least one non-hydrolyzable substituent, at least one of the non-hydrolyzable substituent(s) having an epoxide group thereon;
   (b) a curing catalyst selected from the group consisting of Lewis bases, titanium alkoxides, zirconium alkoxides, and aluminum alkoxides;
   (c) nanoscale particulate inorganic solids having a particle size in the range from 1 nm to 100 nm; and
   (d) at least one organic monomer, oligomer, or polymer containing at least one epoxide group.

2. A domestic appliance according to claim 1, where the curing catalyst is aluminum tri(butoxyethoxide), aluminum tri(sec-butoxide), or a mixture thereof.

3. A domestic appliance according to claim 1, where the at least one hydrolyzable silane is a compound of the formula $X_3SiR$, where each X is independently a hydrolyzable group and R is a glycidyloxy-($C_{1-6}$ alkylene) group.

4. A domestic appliance according to claim 3, where the at least one hydrolyzable silane is glycidyloxypropyltrimethoxysilane, glycidyloxypropyltriethoxysilane, or a mixture thereof.

5. A domestic appliance according to claim 1, where the nanoscale particulate inorganic solids are selected from the group consisting of the oxides, oxide hydrates, nitrides, and carbides of Si, Al, B, Zn, Cd, Ti, Zr, Ce, Sn, In, La, Fe, Cu, Ta, Nb, V, Mo, and W, and mixtures thereof.

6. A domestic appliance according to claim 5, where the nanoscale particulate inorganic solids are boehmite particles.

7. A domestic appliance according to claim 1, where the at least one hydrolyzable silane has been hydrolyzed and condensed together with one or more other hydrolyzable compounds of elements selected from the group consisting of Si, Ti, Zr, Al, B, Sn, and V, the amount of the other hydrolyzable compounds not exceeding 80 mol % of total hydrolyzable compounds present, including the at least one hydrolyzable silane.

8. A domestic appliance according to claim 1, where the hydrolyzable silane of component (a) comprises from 40 to 90 weight percent of all hydrolyzable compounds and components (b) through (d).

9. A domestic appliance according to claim 7, where the hydrolyzable silane of component (a) and the one or more other hydrolyzable compounds taken together comprise from 40 to 90 weight percent of all hydrolyzable compounds and components (b) through (d).

10. A domestic appliance according to claim 1, where the content of the curing catalyst is from 2 to 15 weight percent of all hydrolyzable compounds and components (b) through (d).

11. A domestic appliance according to claim 1, where the nanoscale particulate inorganic solids have a particle size in the range from 2 to 50 nm.

12. A domestic appliance according to claim 11, where the nanoscale particulate inorganic solids have a particle size in the range from 5 to 20 nm.

13. A domestic appliance according to claim 1, where the content of the nanoscale particulate inorganic solids is up to 50 weight percent of all hydrolyzable compounds and components (b) through (d).

14. A domestic appliance according to claim 13 where the content of the nanoscale particulate inorganic solids is from 1 to 40 weight percent of all hydrolyzable compounds and components (b) through (d).

15. A domestic appliance according to claim 14, where the content of the nanoscale particulate inorganic solids is from 1 to 30 weight percent of all hydrolyzable compounds and components (b) through (d).

16. A domestic appliance according to claim 15, where the content of the nanoscale particulate inorganic solids from 1 to 15 weight percent of all hydrolyzable compounds and components (b) through (d).

17. A domestic appliance according to claim 1, where the content of component (d) is from 6 to 30 weight percent of all hydrolyzable compounds and components (b) through (d).

* * * * *